(12) United States Patent
Terada et al.

(10) Patent No.: US 9,800,137 B2
(45) Date of Patent: Oct. 24, 2017

(54) POWER SUPPLY STARTUP SYSTEM

(71) Applicant: HITACHI AUTOMOTIVE SYSTEMS, LTD., Hitachinaka-shi, Ibaraki (JP)

(72) Inventors: Takahide Terada, Tokyo (JP); Mutsumi Kikuchi, Hitachinaka (JP); Akihiko Kudo, Hitachinaka (JP); Takanori Yamazoe, Tokyo (JP); Hiroshi Iwasawa, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 259 days.

(21) Appl. No.: 14/769,744

(22) PCT Filed: Feb. 27, 2013

(86) PCT No.: PCT/JP2013/055029
§ 371 (c)(1),
(2) Date: Aug. 21, 2015

(87) PCT Pub. No.: WO2014/132345
PCT Pub. Date: Sep. 4, 2014

(65) Prior Publication Data
US 2016/0006343 A1  Jan. 7, 2016

(51) Int. Cl.
*H01F 27/42*  (2006.01)
*H02M 1/36*  (2007.01)
*H02J 17/00*  (2006.01)
*H02J 5/00*  (2016.01)

(52) U.S. Cl.
CPC ............... *H02M 1/36* (2013.01); *H02J 5/005* (2013.01); *H02J 17/00* (2013.01)

(58) Field of Classification Search
None
See application file for complete search history.

(56) References Cited

U.S. PATENT DOCUMENTS 5,914,980 A    6/1999  Yokota et al.
9,543,777 B2 *  1/2017  Nakano .................. H02J 7/025
(Continued)

FOREIGN PATENT DOCUMENTS

JP    2000-057453 A    2/2000
JP    2008-084307 A    4/2008
(Continued)

OTHER PUBLICATIONS

Xiaoyu et al., "An Energy-Efficient ASIC for Wireless Body Sensor Networks in Medical Applications", IEEE Transactions on Biomedical Circuits and Systems, IEEE, US, vol. 4, No. 1, Feb. 1, 2010, pp. 11-18.

(Continued)

*Primary Examiner* — Cassandra Cox
(74) *Attorney, Agent, or Firm* — Volpe and Koenig, P.C.

(57) ABSTRACT

A power supply startup system activates a power supply of a device provided with a battery or the like at high speed by a wireless signal while suppressing current consumption on standby. The power supply startup system includes a battery, a device supplied with a power from the battery, and a controller which performs wireless communication with the device. The device includes a power supply section which generates a power supply from the battery, a startup section which receives a wireless startup signal transmitted by the controller and outputs a startup signal to the power supply section, a control section which controls the power supply section and the startup section, and a wireless communication section which performs wireless communication with the controller. The wireless startup signal includes at least two signal regions of a first stage and a second stage.

16 Claims, 10 Drawing Sheets

(56) References Cited

U.S. PATENT DOCUMENTS

| | | | |
|---|---|---|---|
| 2002/0057584 A1* | 5/2002 | Brockmann | H02J 7/025 363/98 |
| 2008/0055047 A1 | 3/2008 | Osada et al. | |
| 2009/0058420 A1* | 3/2009 | Adachi | G01R 33/3692 324/322 |
| 2010/0073003 A1 | 3/2010 | Sakurai et al. | |
| 2012/0200397 A1 | 8/2012 | Nakajima et al. | |
| 2012/0315863 A1 | 12/2012 | Hasegawa | |
| 2015/0180239 A1* | 6/2015 | Noguchi | G05F 1/67 307/52 |

FOREIGN PATENT DOCUMENTS

| | | |
|---|---|---|
| JP | 2010-081716 A | 4/2010 |
| JP | 2012-256959 A | 12/2012 |
| WO | 2011/021242 A1 | 2/2011 |

OTHER PUBLICATIONS

The Extended European Search Report dated Oct. 10, 2016 in the EP Application No. 13876106.9.
Xinkai Chen, et al., "A Wireless Capsule Endoscopic System with a Low-Power Controlling and Processing ASIC," Proceedings of IEEE Asian Solid-State Circuits Conference, pp. 321-324, Nov. 2008.
International Search Report, PCT/JP2013/055029, dated Apr. 2, 2013, 3 pgs.

* cited by examiner

FIG. 3
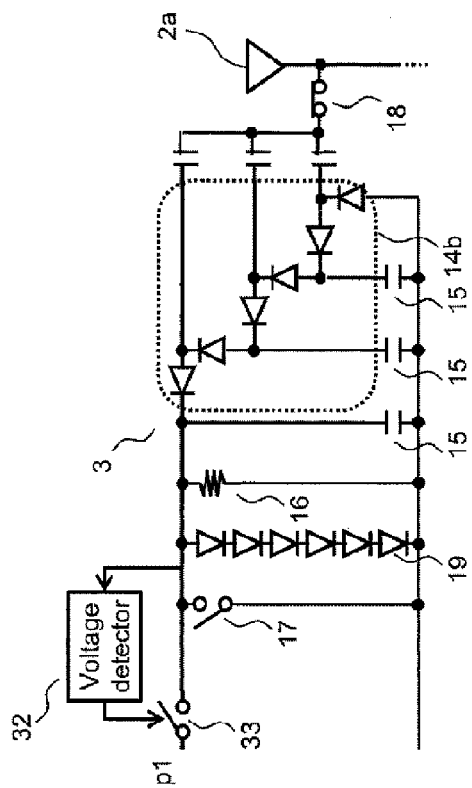
(b)
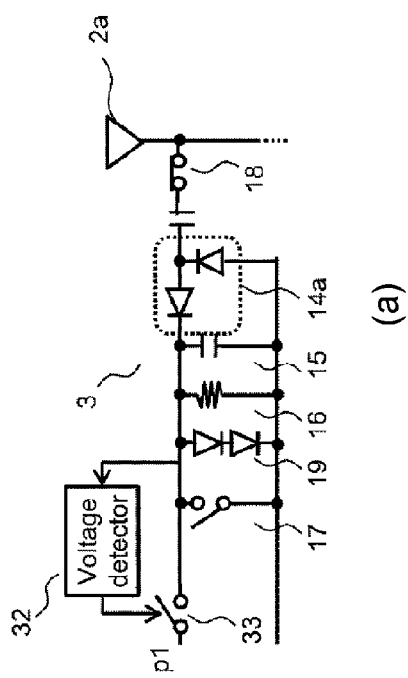
(a)
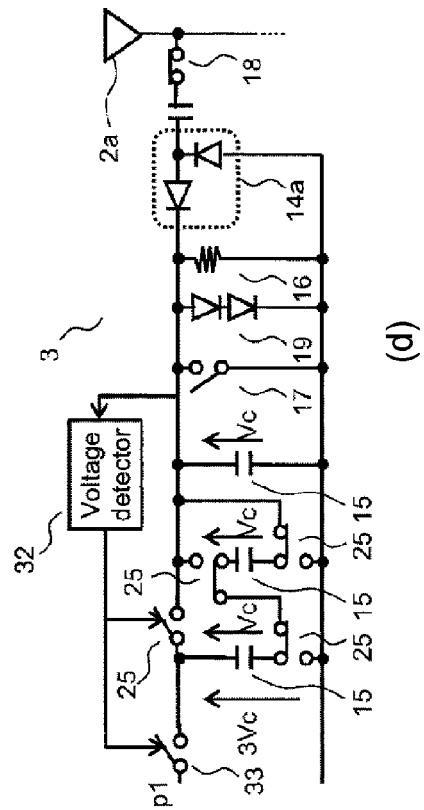
(c)
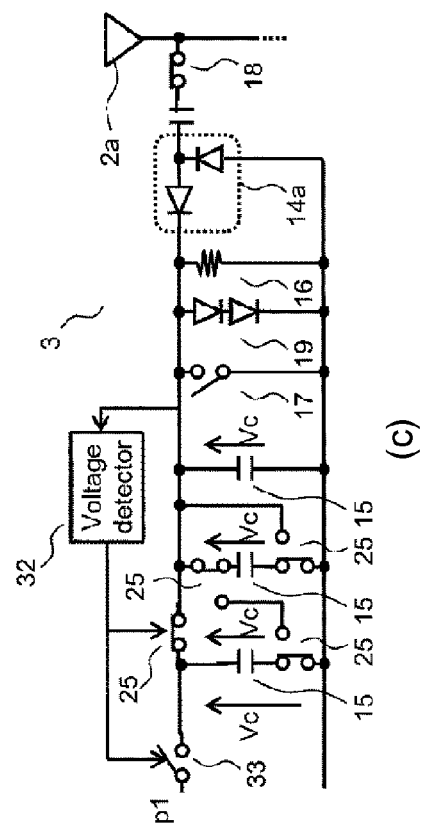
(d)

POWER SUPPLY STARTUP SYSTEM

TECHNICAL FIELD

The present invention relates to a power supply startup system, and particularly relates to a technology effective for applying to power supply startup of a device including a battery or the like by a wireless signal.

BACKGROUND ART

For example, Patent Literature 1 discloses a battery information obtaining device. The device includes voltage obtaining means which obtains an interterminal voltage of a battery cell, a battery information obtaining circuit in which the obtained voltage is supplied as a power supply voltage and which obtains battery information from the battery cell, a wireless circuit in which the obtained voltage is supplied as the power supply voltage and which transmits a signal of the battery information to a management unit via an antenna, a rectifier circuit which receives and rectifies a wireless signal of a predetermined frequency from the management unit via an antenna to generate a DC voltage, and a control circuit in which the generated DC voltage is supplied as the power supply voltage and which controls supply of the power supply voltage to the battery information obtaining circuit and the wireless circuit.

Further, regarding the wireless startup system, a prototype IC capable of generating a current of 2.7 µA and receiving a command at a data rate of 25 kbps upon receiving a wireless power of 60 µW is reported (Non-patent Literature 1).

CITATION LIST

Patent Literature

Patent Literature 1: Japanese Patent Application Laid-Open No. 2010-081716

Non-Patent Literature

Non-patent Literature 1: Xinkai Chen, et al., "A Wireless Capsule Endoscopic System with a Low-Power Controlling and Processing ASIC," Proceedings of IEEE Asian Solid-State Circuits Conference, pp. 321-324, November 2008.

SUMMARY OF INVENTION

Object to be Achieved by the Invention

In the battery information obtaining device described in the above Patent Literature 1, the DC voltage generated after receiving and rectifying the wireless signal is supplied to the control circuit (a startup circuit) as the power supply voltage. Accordingly, when the wireless signal is interrupted, supply of the power supply voltage is also interrupted, and the startup circuit cannot perform power supply control of each circuit. Further, the startup circuit performs reception of a power supply instruction by the wireless signal and the power supply control of each circuit. The startup circuit obtains all the power for these from the wireless signal. Therefore, it is necessary either to receive the wireless signal of large power or to receive the wireless signal over a long period.

A time required for startup by a wireless signal is estimated by using numerical values described in the above Non-patent Literature 1. When a wireless signal of a startup instruction has 256 bits, a reception time of the wireless signal is about 10 ms in an environment capable of receiving sufficient wireless power (e.g., a distance of several mm of a noncontact IC card or the like). However, in order to receive the wireless signal, it is necessary to supply power to a startup circuit beforehand, and it takes time to receive a wireless signal for supplying power therefor. If the reception time of the wireless signal for supplying power is about 20 ms, a total time required for receiving the wireless signal is about 30 ms. If the wireless startup system is used in an environment capable of receiving only one tenth of the wireless power, the time required is about 210 ms or more. In reality, since a leak current of a circuit or deterioration of efficiency of a rectifier circuit due to wireless power reduction, it requires a much longer time. In this way, the startup time becomes longer in a general wireless communication environment incapable of receiving sufficient wireless power.

An object of the present invention is to provide an apparatus or system which activates a power supply of a device provided with a battery or the like at high speed by a wireless signal while suppressing current consumption on standby.

Means for Achieving the Object

A summary of typical aspects of the present invention disclosed in the present application is briefly described as follows.

A power supply startup system according to a typical aspect includes: a battery; a device supplied with power from the battery; and a controller which performs wireless communication with the device, wherein the device includes a power supply section which generates a power supply from the battery, a startup section which receives a wireless startup signal transmitted by the controller and outputs a startup signal to the power supply section, a control section which controls the power supply section and the startup section, and a wireless communication section which performs wireless communication with the controller, the wireless startup signal includes at least two signal regions of a first stage and a second stage, when receiving the first stage of the wireless startup signal, the startup section outputs a first startup signal to the power supply section, the power supply section, to which the first startup signal has been input, supplies a first power to the startup section, when receiving the second stage of the wireless startup signal, the startup section supplied with the first power outputs a second startup signal to the power supply section, and the power supply section, to which the second startup signal has been input, supplies a second power to the control section, and the control section controls power supply to the power supply section, the startup section, and the wireless communication section and operation thereof.

Further, a power supply startup system according to another typical aspect includes: a battery; a device supplied with power from the battery; and a controller which performs wireless communication with the device, wherein the device has a power supply section which generates a power supply from the battery, a startup section which receives a wireless startup signal transmitted by the controller and outputs a startup signal to the power supply section, a control section which controls the power supply section and the startup section, and a wireless communication section which performs wireless communication with the controller, the startup section includes a rectifier section which rectifies the input wireless startup signal and a reception section which receives the wireless startup signal, and the startup section is supplied with powers from the rectifier section and the power supply section.

Advantageous Effects of the Invention

An effect obtained by the typical aspects of the present invention disclosed in the present application is briefly described as follows.

A power supply of a device provided with a battery or the like can be woken up at high speed by a wireless signal.

BRIEF DESCRIPTION OF DRAWINGS

FIGS. 3(a) to 3(d) are circuit diagrams illustrating circuit configuration examples of a rectifier section in a power supply startup device.

MODE FOR CARRYING OUT THE INVENTION

Embodiment 1

In the present embodiment, a power supply startup system having a device provided with a battery cell is described with reference to the drawings.

Figure 1:
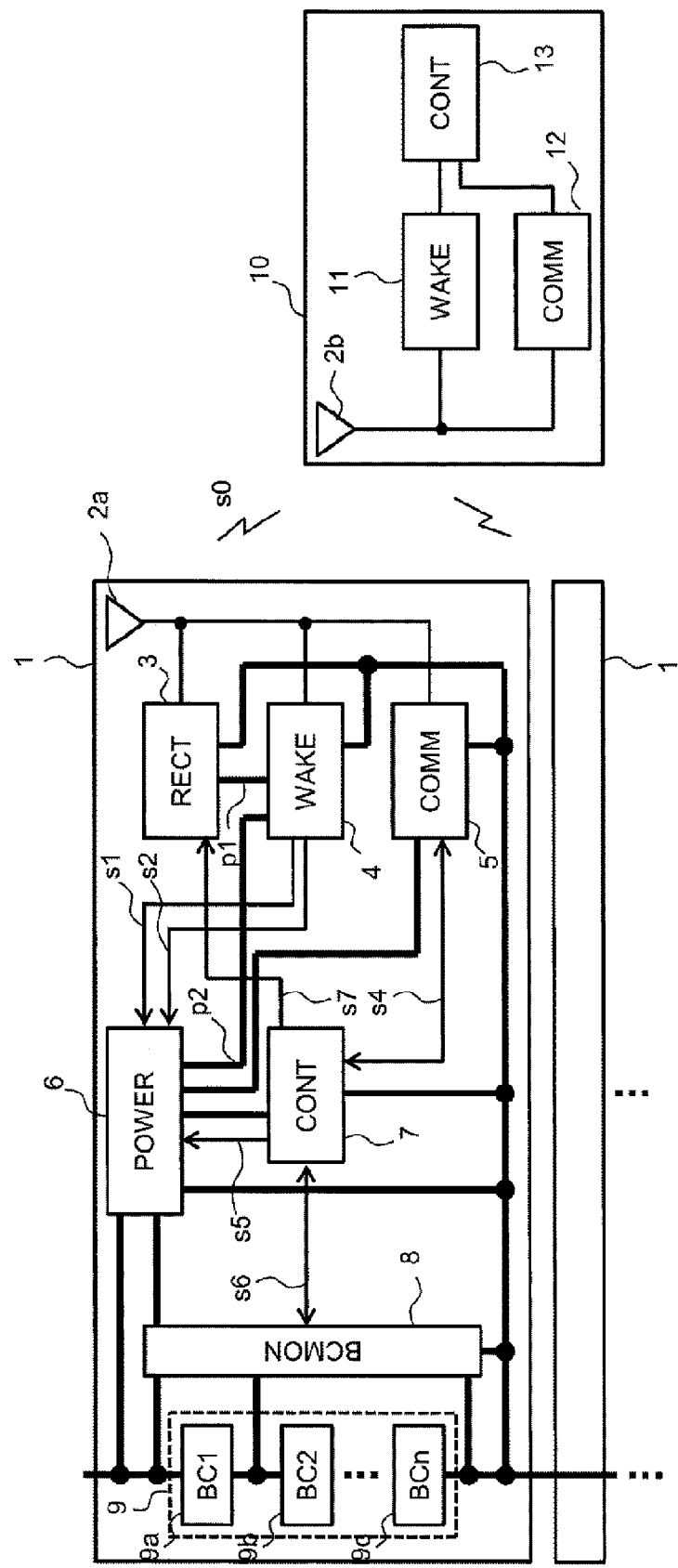
FIG. 1 is a block diagram illustrating a configuration example of a power supply startup system according to Embodiment 1.

FIG. 1 is a block diagram illustrating a configuration example of the power supply startup system. The power supply startup system includes one or a plurality of power supply startup devices 1 provided with a battery cell group 9 and a master controller 10. The battery cell group 9 includes battery cells 9a, 9b, and 9c. The number of battery cells configuring the battery cell group 9 is not limited to three, and it may be one or more. In each of the plurality of power supply startup devices 1, terminals at an uppermost level potential and a lowermost level potential of the battery cell group 9 are connected in series. The power supply startup device 1 includes an antenna 2a, and the master controller 10 includes an antenna 2b. The power supply startup device 1 and the master controller 10 perform wireless signal transmission via these antennas. By means of the wireless signal transmission, the master controller 10 activates the power supply startup device 1, and instructs monitoring of a voltage, a temperature, or the like of the battery cell group 9 and control of balancing of a remaining charge amount of the battery cell group 9. When the monitoring and the control are not needed, the master controller 10 instructs the power supply startup device 1 to stop.

The master controller 10 includes a startup transmission section 11 which generates a wireless startup signal s0 for waking up the power supply startup device 1, a communication section 12 which transmits an instruction to monitor and control the battery cell group 9 to the power supply startup device 1 and receives monitoring and control information, and a control section 13 which controls the startup transmission section 11 and the communication section 12.

The power supply startup device 1 includes a rectifier section 3, a startup reception section 4, a communication section 5, a power supply section 6, a control section 7, and a battery cell monitoring section 8. The rectifier section 3 rectifies the wireless startup signal s0 received by the antenna 2a and outputs a power p1 to the startup reception section 4. The startup reception section 4 detects a data pattern of the received wireless startup signal s0 to determine whether or not the startup is needed and outputs a first startup signal s1 and a second startup signal s2. The communication section 5 communicates with the master controller 10, and the power supply section 6 supplies power obtained from the battery cell group 9. The control section 7 controls operation of the rectifier section 3, the startup reception section 4, the communication section 5, the power supply section 6, and the battery cell monitoring section 8. The battery cell monitoring section 8 monitors the voltage, the temperature, or the like of the battery cell group 9 and performs balancing of the remaining charge amount. The communication section 5 outputs data received from the master controller 10 to the control section 7, and data to be transmitted to the master controller 10 is input to the communication section 5 from the control section 7 (s4). The power supply section 6 supplies power to the startup reception section 4, the communication section 5, the control section 7, and the battery cell monitoring section 8. Supply of a power p2 to the startup reception section 4 is started after input of the first startup signal s1. Supply of power to the control section 7 is started after input of the second startup signal s2. Supply of power to the communication section 5 and the battery cell monitoring section 8 is started by an instruction s5 from the control section 7. It is preferable that a linear regulator capable of outputting a desirable voltage in a short time be used for the power supply from the power supply section 6 to the startup reception section 4 and the control section 7. On the other hand, it is preferable that a switching regulator or a DC-DC converter having good voltage conversion efficiency be used for power supply to the communication section 5, the battery cell monitoring section 8, or the like. Further, after the power supply to the control section 7 and startup thereof, it is preferable that the supply of the power p2 to the startup reception section 4 be stopped by the instruction s5 from the control section 7.

It is preferable that, simultaneously with reception of the power supply, the control section 7 be reset and startup to perform predetermined operation. For example, as with a POWER ON RESET function generally mounted on a microcontroller unit, it is preferable that an internal resistor be initialized and the control section 7 be transited to a predetermined state upon receiving the power supply. Alternatively, after the power supply to the control section 7 is started by the second startup signal s2, the power supply section 6 or the startup reception section 4 may output a reset signal to the control section 7 to startup the control section 7. Further, the woken-up control section 7 may immediately start the power supply from the power supply section 6 to the communication section 5 and receive an instruction from the master controller 10 by setting the communication section 5 in a reception state.

Further, when the control section 7 is instructed from the master controller 10 to stop operation of the power supply startup device 1 or does not receive the monitoring or control instruction from the master controller 10 for a predetermined period, the operation of the power supply startup device 1 is stopped. At this time, the control section 7 interrupts the power supply from the power supply section 6 to the sections other than the control section 7. The control section 7 finally instructs the power supply section 6 to stop the power supply section 6 and to interrupt the power supply to the control section 7 (s5).

Further, after the startup, it is preferable that the control section 7 stop the operation of the rectifier section 3 (s7), or that the control section 7 control the power supply section 6 to interrupt power supply to the startup reception section 4 and stop operation of the startup reception section 4 (s5).

The battery cell monitoring section 8 receives a voltage monitoring instruction of the battery cells 9a, 9b, 9c from the control section 7 and measures the voltages of the battery cells 9a, 9b, 9c. The battery cell monitoring section 8 transmits the measurement result to the control section 7 (s6).

Further, a power supply of the master controller 10 is obtained from a battery different from the battery cell group 9 or a commercial AC power supply. Moreover, the master controller 10 may perform wire communication with an external system. With these, it is preferable that the master controller 10 be always in an operation state or set in the operation state by receiving a startup signal from the external system via the wire communication.

Figure 2:
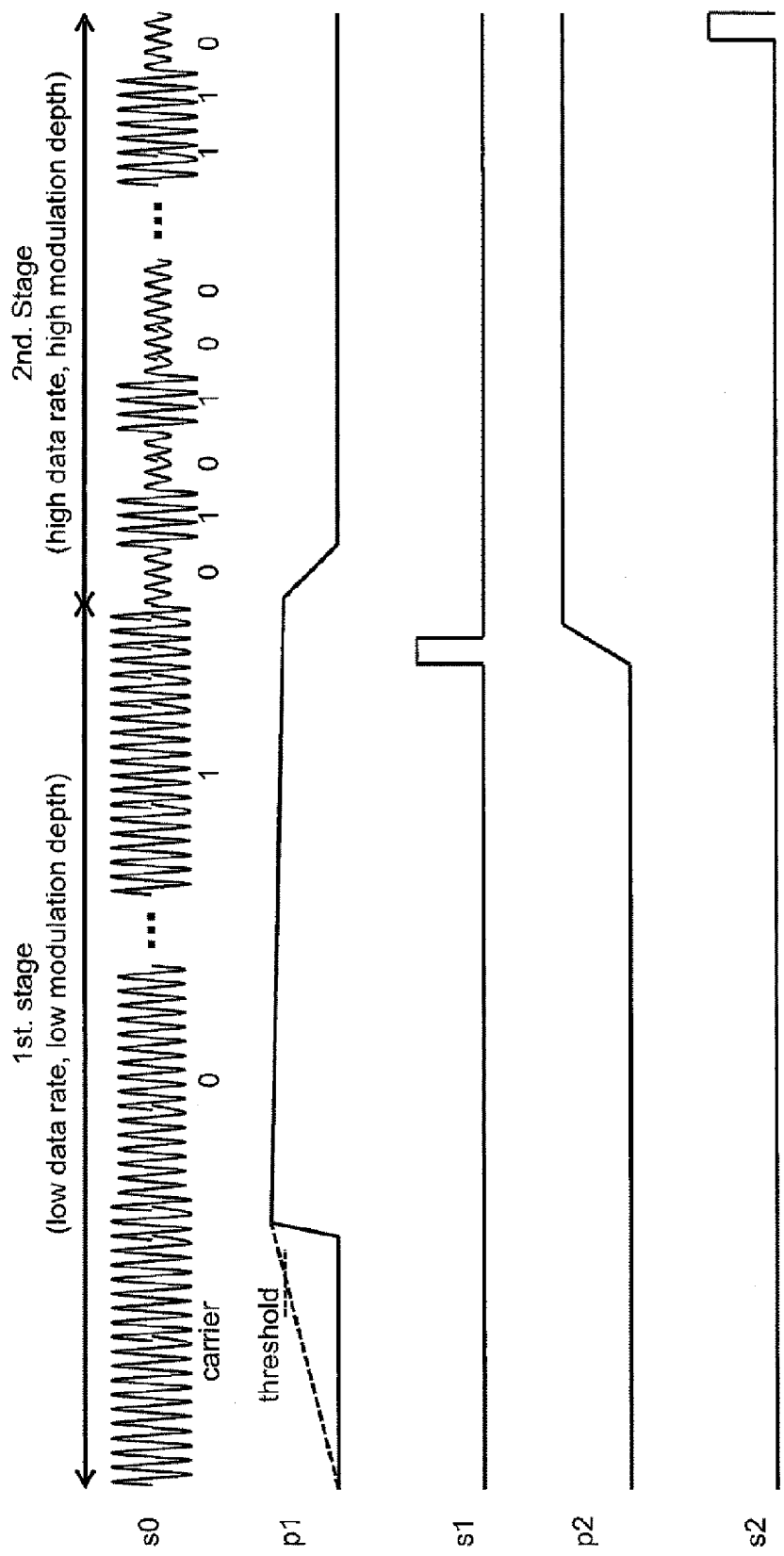
FIG. 2 is a signal waveform chart for describing a power supply startup method in the power supply startup system.

FIG. 2 is a signal waveform example for describing a relationship between the powers p1, p2 supplied to the startup reception section 4 and the wireless startup signal s0, the first startup signal s1, the second startup signal s2. The wireless startup signal s0 has two stages of a first stage and a second stage. When the rectifier section 3 starts to receive the first stage of the wireless startup signal s0, the rectifier section 3 rectifies the wireless startup signal s0 and stores a charge in a storage element inside. When the voltage applied to the storage element exceeds a preset threshold voltage due to the stored charge, the stored charge starts to be supplied to the startup reception section 4 as the power p1. Since the reception startup section 4 does not receive supply of the power p1 in a period from when the rectifier section 3 starts to receive the wireless startup signal s0 to when the power p1 is supplied to the startup reception section 4, the data pattern of the wireless startup signal s0 cannot be detected. Accordingly, instead of a data pattern for determining startup, a carrier wave or a data array having no meaning may be provided at a beginning of the first stage of the wireless startup signal s0. A signal shape is not limited as long as the power is obtained to utilize as the power p1.

When the power p1 is supplied, the startup reception section 4 starts the operation and starts to detect the data pattern. When the power of the rectifier section 3 which receives and rectifies the wireless startup signal s0 is smaller than power consumption of the startup reception section 4, a voltage of the power p1 gradually lowers. The startup reception section 4 detects the data pattern at the first stage of the wireless startup signal s0 by using the power p1. Accordingly, until completion of the detection of the data pattern at the first stage of the wireless startup signal s0, the carrier wave at the beginning of the first stage of the wireless startup signal s0 needs to secure a sufficient period in such a manner that the voltage of the power p1 does not fall below a voltage required for the operation of the startup reception section 4. Further, the storage element of the rectifier section 3 also needs to have sufficient capacity so as to be able to supply the power to the startup reception section 4. In order to simplify a configuration of the startup reception section 4 and reduce the power consumption thereof, it is desirable that the data pattern be amplitude-modulated (ASK).

In the data pattern at the first stage of the wireless startup signal s0, it is desirable that a data rate and a modulation depth be low. It is because larger power consumption is required since a circuit is operated at high speed to receive a high-speed signal. An operation period of the startup reception section 4 can be shortened by increasing the speed of the signal, but in general, required power consumption tends to rise. When the power consumption is large, it is necessary to receive the wireless startup signal s0 at the beginning over a longer period and store larger power in the power p1. Further, when the modulation depth is high, a signal strength indicating data 0 is small. Accordingly, the power obtained from the wireless startup signal s0 decreases and a voltage drop of the power p1 becomes large. In the data pattern at the first stage, it is preferable that a pattern corresponding to a clock signal be first provided and a frequency of the clock signal of the startup reception section 4 be set.

The modulation of the data pattern is not limited to the ASK. According to a communication quality to be assumed and a surrounding electromagnetic wave propagation environment, frequency modulation (FSK), phase modulation (PSK), or other modulation which is insusceptible to noise may be used.

Upon completing detection of the data pattern at the first stage of the wireless startup signal s0, the startup reception section 4 compares whether the detected data pattern matches a predetermined data pattern. As a result, if the detected data pattern matches the predetermined data pattern, it is determined that the detected data pattern is correct, and the startup reception section 4 outputs the first startup signal s1. If the data patterns do not match, the first startup signal s1 is not output, and a reception state is continued as it is. If the rectifier section 3 receives noise instead of the wireless startup signal s0 and starts to supply the power p1, a probability that the data pattern detected by the startup reception section 4 matches the predetermined data pattern is low, and a probability that the first startup signal s1 is output is also low. Therefore, a probability that the power supply startup device 1 erroneously activates is also low. In other words, the first startup signal s1 is output only when it is determined that the detected data pattern is the one at the first stage of the wireless startup signal s0 which instructs the startup of the power supply startup device 1. When the noise is received, the startup reception section 4 determines that it is not the one at the first stage of the wireless startup signal s0. Then, the startup reception section 4 stops the operation along with depletion of the power p1 produced by rectifying the noise. With this configuration, the erroneous startup can be reduced without consuming the power of the battery cell group 9. The first startup signal s1 may be a pulse signal, or may be a signal which transits between low and high, such as a step response.

When the first startup signal s1 is input, the power supply section 6 supplies the power p2 to the startup reception section 4 by using the power obtained from the battery cell group 9. The power p1 and the power p2 may be directly connected. The power p1 is in a state in which the wireless startup signal s0 is rectified and the charge is stored in the storage element. Since a current obtained by rectifying the wireless startup signal s0 is usually smaller than current consumption of the startup reception section 4, the power p1 functions as capacity for the power p2 and the current consumption of the startup reception section 4 is apparently decreased. Alternatively, regarding the power supply to the startup reception section 4, a power supply path may be switched from the power p1 to the power p2 by a switch simultaneously with the start of supply of the power p2. In this case, it is possible that the operation of the rectifier section 3 is stopped and that the input of the rectifier section 3 is separated from the antenna 2a. With this configuration, all signal power of the wireless startup signal s0 is input to the startup reception section 4, and the startup reception section 4 detects the data pattern of the wireless startup signal s0 more easily. Accordingly, it is possible to reduce the power consumption of the startup reception section 4 or to shorten a period of the second stage of the wireless startup signal s0 by increasing the data rate.

Even if the power p1 obtained from the wireless startup signal s0 is depleted, the startup reception section 4 supplied with the power p2 is operable. With this configuration, not the power necessary for detecting all the data patterns of the wireless startup signal s0, but only the power necessary for detecting the data pattern at the first stage may be supplied from the rectifier section 3 to the startup reception section 4 as the power p1. Accordingly, it is possible that the rectifier section 3 reduces the charge amount required to be stored at a beginning part (a part of the carrier wave in FIG. 2) of the first stage of the wireless startup signal s0 and shortens the beginning part of the first stage of the wireless startup signal s0. In this way, the power supply startup device 1 can be woken up at high speed.

Further, since the startup reception section 4 supplied with the power p2 is operable even without the power p1 obtained from the wireless startup signal s0, it is also possible to reduce the signal power of the wireless startup signal s0 transmitted by the master controller 10. Reduction of the signal power of the wireless startup signal s0 transmitted by the master controller 10 makes it possible to reduce power consumption of the master controller 10 or to suppress interference with communication of another system.

Further, when the power supplied to the startup reception section 4 is increased by the power p2, a high-speed signal or a signal having a high modulation depth can be received. With this configuration, since the data rate and the modulation depth can be increased at the second stage of the wireless startup signal s0, the power supply startup device 1 can be woken up at higher speed.

In the same way as the first stage of the wireless startup signal s0, the modulation of the data pattern is not limited to the ASK. According to a communication quality to be assumed and a surrounding electromagnetic wave propagation environment, the frequency modulation (FSK), the phase modulation (PSK), or the other modulation which is insusceptible to noise may be used.

Upon completing detection of the data pattern at the second stage of the wireless startup signal s0, the startup reception section 4 compares whether the detected data pattern matches a predetermined data pattern. As a result, if the detected data pattern matches the predetermined data pattern, it is determined that the detected data pattern is correct, and the startup reception section 4 outputs the second startup signal s2. If the data patterns do not match, the second startup signal s2 is not output, and a reception state is continued as it is. If the data patterns do not match even after a predetermined period has elapsed, it is considered that the detected data pattern is not the one of the wireless startup signal s0. Accordingly, the power supply section 6 stops supply of the power p2. With this configuration, the startup reception section 4 is set in a stop state, and the power supply section 6 is transited to the stop state. Alternatively, the startup reception section 4 may output a stop signal to the power supply section 6 and stop supply of the power p2. In this way, only when all the data patterns of the wireless startup signal s0 match the predetermined data pattern, the power is supplied from the power supply section 6 to the control section 7, and the power supply startup device 1 activates. Accordingly, erroneous startup caused by erroneous detection of noise or the like can be prevented. The second startup signal s2 may be a pulse signal, or may be a signal which transits between low and high, such as a step response.

Further, the wireless startup signal s0 may have two stages or more and may have three stages. When the number of stages is increased and the power consumption of the startup reception section 4 is increased as it goes to a rear stage, the power supply startup device 1 can be woken up at higher speed by increasing the data rate or the like. Alternatively, the power consumption in the stop state can be reduced by distinguishing between the noise and the wireless startup signal s0 more accurately at a stage where the power consumption of the startup reception section 4 is small.

FIGS. 3(a) to 3(d) are circuit configuration examples of the rectifier section 3. The rectifier section illustrated in FIG. 3(a) includes a rectifier circuit 14a using a diode, a storage element 15, a discharge resistor 16, switches 17, 18, 33, a voltage limiter 19, and a voltage detector 32. The wireless startup signal s0 is rectified by the rectifier circuit 14a, and the power is stored in the storage element 15. At this time, the storage element 15 stores necessary power in such a manner that the startup reception section 4 can continue the operation in a predetermined period. Various implementation means, such as a capacitor, a supercapacitor, or a small battery, can be considered as the storage element 15. The discharge resistor 16 is provided so as to receive a wireless signal of the other system, such as a wireless LAN, a mobile phone, or a broadcast radio wave, and so as not to store power unnecessarily in the storage element 15. With this configuration, the power is prevented from being stored in the storage element 15 by the wireless signal power having a predetermined level or less, and a possibility of erroneously detecting the wireless signal of the other system can be reduced.

The switches 17, 18 are controlled by the control section 7. When the power supply of the startup reception section 4 is switched from the power p1 to the power p2 upon receiving the second stage of the wireless startup signal s0, the switches 17, 18 are used to separate the rectifier section 3 from the antenna 2a and stop the operation. The voltage limiter 19 applies a limit in such a manner that an output voltage (voltage of the power p1) of the rectifier section 3 does not increase excessively. When the rectifier circuit 14a includes two diodes, the current hardly flows until the output voltage reaches a total voltage of threshold voltages of the two diodes, thereby increasing the voltage. However, when the output voltage exceeds the threshold voltages of the diodes, the current starts to flow and an increase in the voltage is suppressed. The rectifier circuit 14 including the two diodes and the voltage limiter are illustrated as the configuration example. However, the number of diodes may be changed according to a voltage level of the power p1. FIG. 3(b) is a configuration example in which the number of diodes in the rectifier circuit 14 is increased to six.

The voltage detector 32 detects whether the voltage of the storage element 15 exceeds the preset threshold voltage. When the voltage exceeds the preset threshold voltage, the voltage detector 32 closes the switch 33. When the switch 33 is closed, the charge stored in the storage element 15 is supplied to the startup reception section 4 as the power p1. The voltage detector 32 is operated with the power stored in the storage element 15.

FIGS. 3(c) and 3(d) are configuration examples in which the voltage of the power p1 is increased not by increasing the number of diodes in the rectifier circuit 14 but the voltage of the power p1 is increased by switching a connection of the storage element 15 by switches 25. In a state of the switches 25 in FIG. 3(c), three storage elements 15 are connected in parallel, and a voltage Vc is applied to each storage element 15. When the switches 25 are switched from this state to a state in FIG. 3(d), the storage elements 15 are changed to a series connection. Accordingly, the voltages Vc applied to the respective storage elements 15 are connected in series, and the voltage of the power p1 becomes 3Vc. In the same way as the switch 33, the switches 25 are controlled by the voltage detector 32. When the voltage of the storage element 15 exceeds the preset threshold value, the storage elements 15 are switched from the parallel connection to the series connection. When the power supply of the startup reception section 4 is switched from the power p1 to the power p2 upon receiving the second stage of the wireless startup signal s0, the voltage of the storage element 15 falls below the preset threshold value due to the switching of the switches 17, 18. Accordingly, the storage elements 15 are switched from the series connection to the parallel connection.

Figure 4:
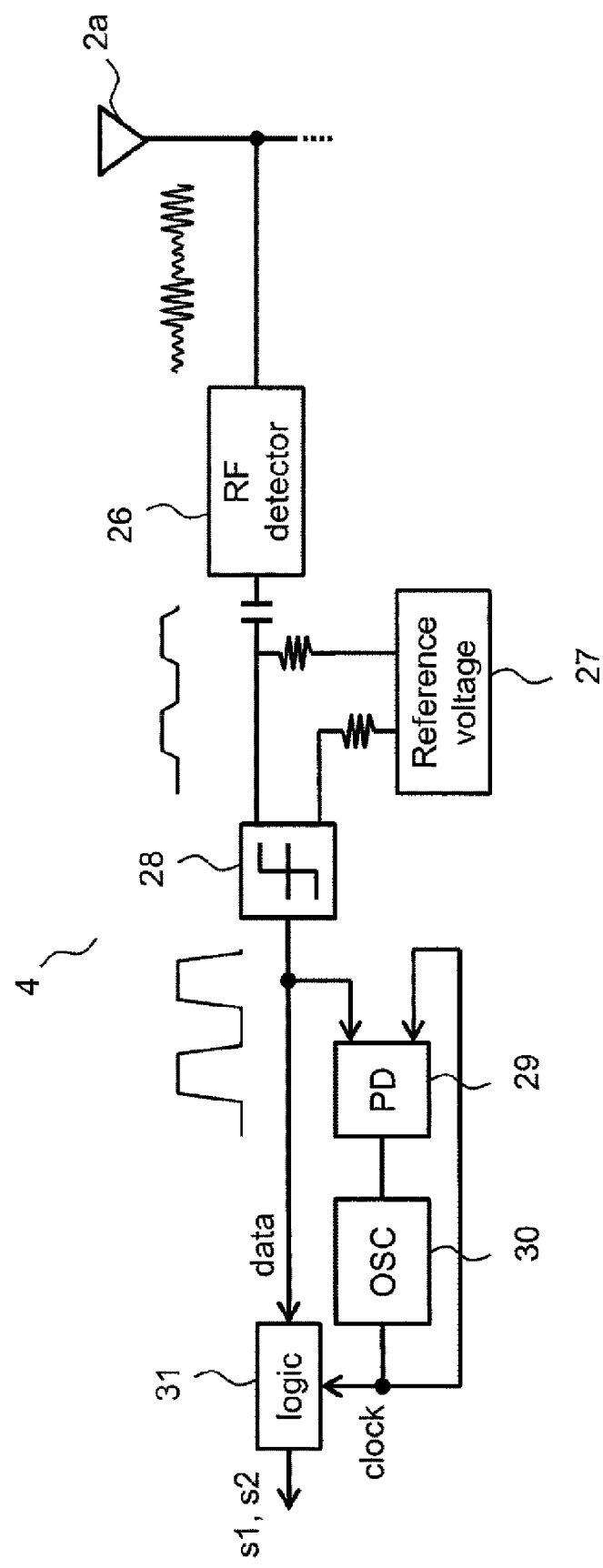
FIG. 4 is a circuit diagram illustrating a circuit configuration example of a startup reception section in the power supply startup device.

FIG. 4 is a configuration example of the startup reception section 4. An RF detector 26 detects the wireless startup signal s0 received by the antenna 2a, and a comparator 28 compares the signal s0 with a reference voltage generated by a reference voltage generation section 27, thereby obtaining a data pattern. Then, a phase comparator 29 adjusts a frequency of a clock signal by comparing the clock signal of an oscillator 30 and the data pattern. The data pattern and the clock signal are input to a logic circuit 31, where it is determined whether the data pattern and the clock signal match a predetermined data pattern.

In order to adjust an oscillation frequency of the oscillator 30, it is preferable that a beginning of the data pattern be a pattern corresponding to the clock frequency. After the clock frequency is adjusted at the beginning, the phase comparator 29 may be stopped to fix the oscillation frequency of the oscillator 30, or may continuously adjust the frequency by using apart of a remaining data pattern (e.g., a rising edge). When the adjustment is continuously effected, even if the oscillation frequency of the oscillator 30 gradually changes with a lapse of time, the oscillator 30 is controlled so as to cancel the change periodically. Accordingly, the data is not missed.

In contrast with the first stage of the wireless startup signal, the operation can be performed at higher speed at the second stage by increasing current consumption of the RF detector 26 or the oscillator 30.

Hereinabove, application of the power supply startup system according to the present embodiment makes it possible to shorten the data pattern to be received by the power obtained from the wireless startup signal s0 and makes it possible to shorten the wireless startup signal s0. Accordingly, the startup can be performed at high speed by the wireless signal.

Further, the part of the data pattern can be transmitted at high speed by receiving the power supply from the power supply section 6, and the startup can be performed at high speed by the wireless signal.

Further, since the power supply section 6 interrupts the power supply in the stop state and the power is hardly consumed, the current consumption in the stop state can be reduced.

Further, since the storage element is provided at the output of the rectifier section to store the charge, the startup can be performed even by the weak wireless startup signal s0.

Further, the discharge resistor is provided at the output of the rectifier section and the voltage of the power p1 is increased only when the wireless signal has the predetermined signal strength or more. Accordingly, the possibility of erroneously detecting the signal of the other system or the noise can be reduced.

Further, in the present embodiment, each power supply startup device 1 has the configuration in which terminals at an uppermost level potential and a lowermost level potential of the battery cell group 9 are connected in series. However, these may be independent of each other without being connected, or the mutual uppermost potentials and the mutual lowermost potentials may be connected.

Further, the battery cells 9a, 9b, 9c connected in series are provided in the present embodiment. However, battery cells connected in parallel may be provided, or one battery cell may be provided.

Embodiment 2

In the present embodiment as well, a power supply startup system having a device provided with a battery cell is described with reference to the drawings.

Figure 5:
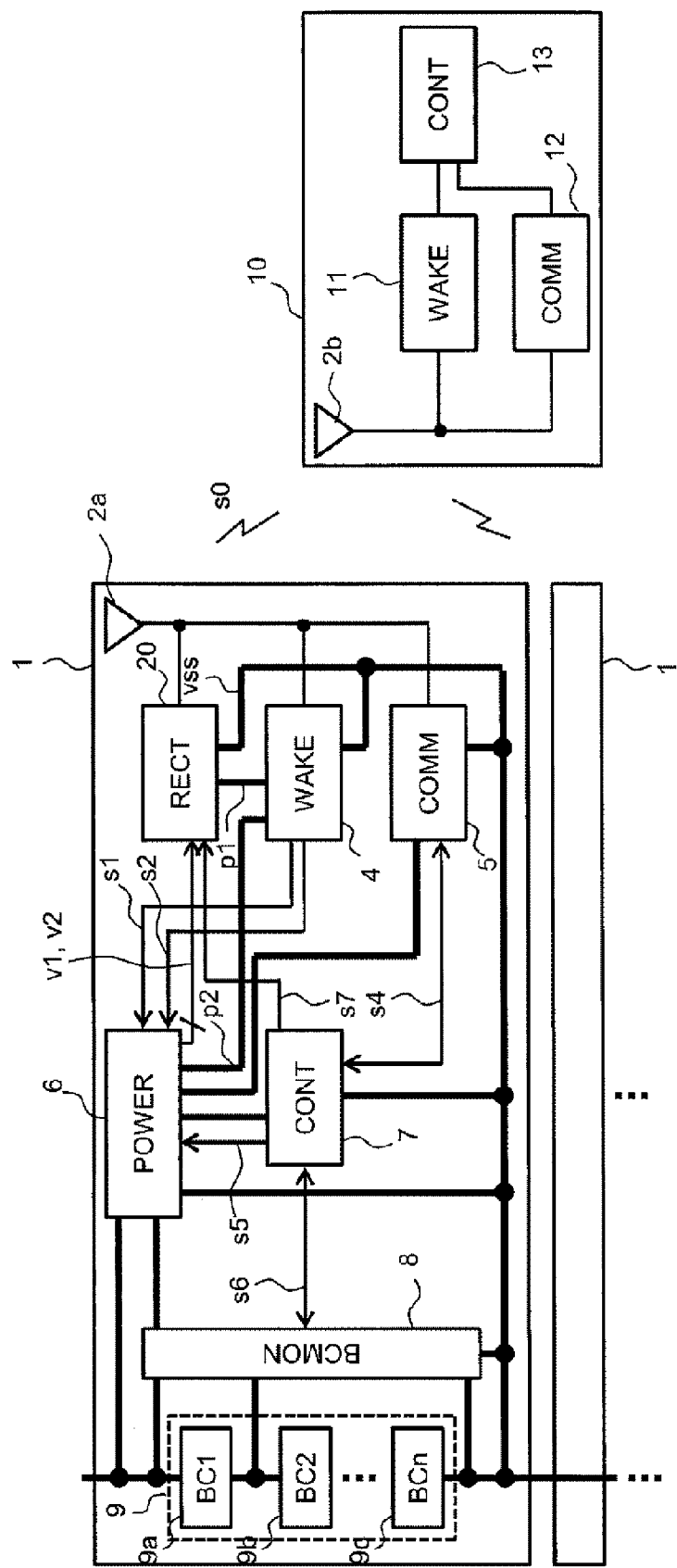
FIG. 5 is a block diagram illustrating a configuration example of a power supply startup system according to Embodiment 2.

FIG. 5 is a block diagram illustrating a configuration example of the power supply startup system. Rectification efficiency of a rectifier section 19 is improved by outputting bias voltages v1, v2 from a power supply section 6 to the rectifier section 19. Improvement of the rectification efficiency makes it possible to startup by a weaker wireless startup signal s0 or makes it possible to startup by a shorter wireless startup signal s0. Since the power supply section 6 consumes a small amount of current even in a standby state to generate the bias voltages v1, v2, it is effective in a case where this current is permissible. Further, means of generating the bias voltages v1, v2 may generate the voltages by resistance-dividing or the like a voltage of a bandgap reference circuit or a battery cell group 9. The current consumption can be reduced by increasing a resistance value.

Figure 6:
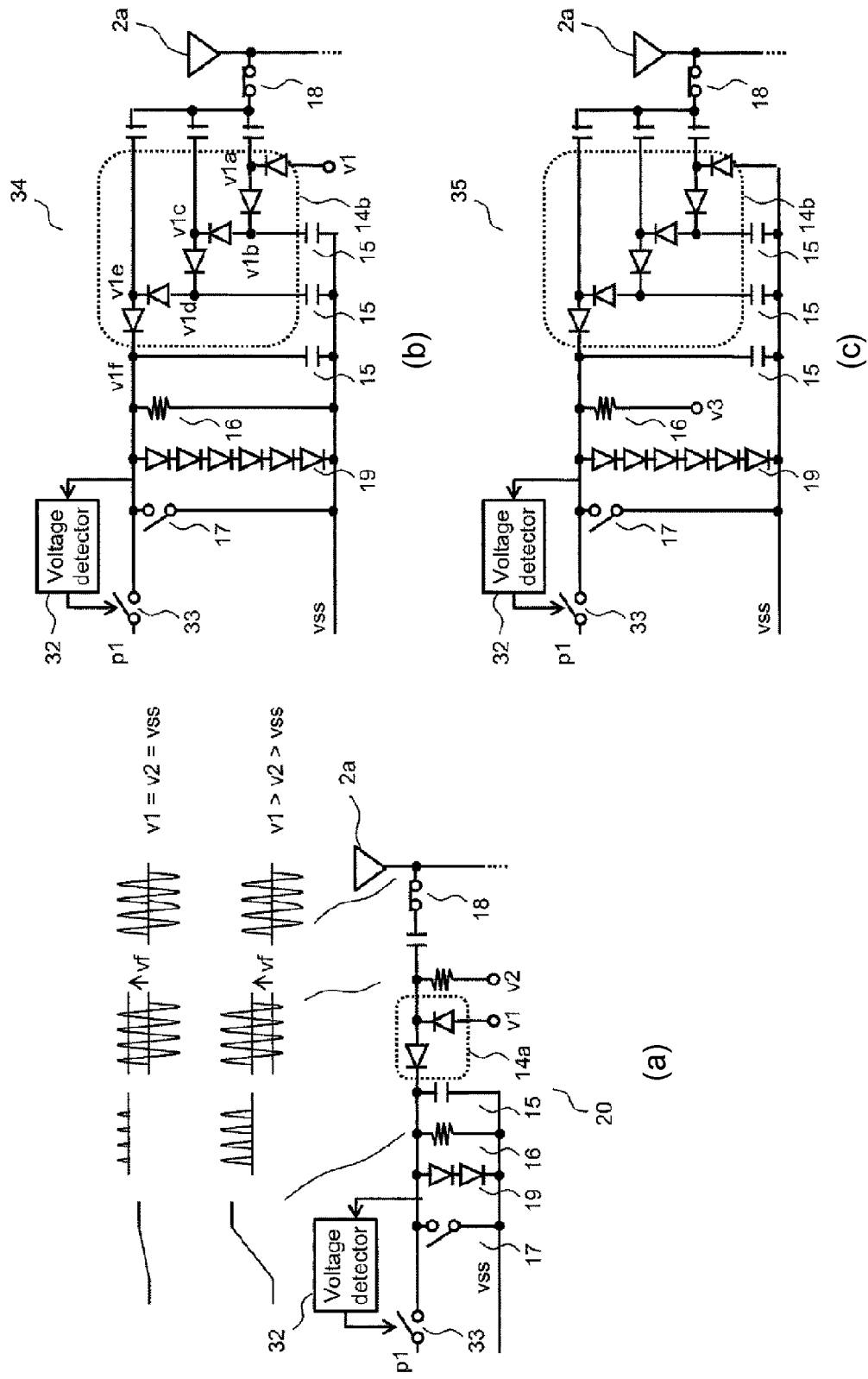
FIGS. 6(a) to 6(c) are circuit diagrams illustrating circuit configuration examples of a rectifier section in a power supply startup device.

FIGS. 6(a) to 6(c) are a circuit configuration example of the rectifier section 20 and variations thereof. FIG. 6(a) is a configuration example of the rectifier section 20 to which the bias voltages v1, v2 are applied to improve the rectification efficiency, FIG. 6(b) is a variation 34 of the rectifier section 20 to which only the bias voltage v1 to improve the rectification efficiency, and FIG. 6(c) is a variation 35 of the rectifier section 20 in which a voltage v3 is applied to an output terminal of a rectifier circuit 14b to precharge. Any of the rectifier sections 20 can receive smaller wireless startup signal s0 or can receive a shorter wireless startup signal s0.

In the rectifier section 20 in FIG. 6(a), the bias voltage v2 is applied to an input terminal of a rectifier circuit 14a via a resistor, and the bias voltage v1 is applied to an anode of one diode configuring the rectifier circuit 14a.

When the received wireless startup signal s0 is rectified by the rectifier circuit 14a, only an amount of voltage amplitude that exceeds a forward voltage vf of the diode is taken out to an output of the rectifier circuit 14a as the power. This is because the diode has a property in which a current hardly flows when a voltage less than the threshold voltage vf is applied in a forward direction, and a large current flows when the voltage exceeds the threshold voltage vf. Accordingly, when the voltage amplitude of the wireless startup signal s0 is small, the rectification efficiency is significantly deteriorated.

Consequently, a voltage close to the forward voltage vf is applied to each diode by setting the bias voltage v1 higher than the bias voltage v2 and setting the bias voltage v2 higher than a voltage vss. With this configuration, the voltage amplitude of the received wireless startup signal s0 can be taken out more efficiently to the output of the rectifier circuit 14a as the power.

In the rectifier section 34 in FIG. 6(b), the bias voltage v1 is applied to an anode of one diode configuring a rectifier circuit 14b. Bias voltages v1a, v1b, v1c, v1d, v1e, v1f divided by an impedance of the diode are applied to anodes of remaining diodes configuring the rectifier circuit 14b. With this configuration, v1 is set highest and v1f is set lowest in a reception standby state of the wireless startup signal s0. Accordingly, in the same way as the rectifier section 20 in FIG. 6(a), a voltage amplitude of the received wireless startup signal s0 can be taken out more efficiently to the output of the rectifier circuit 14a as the power.

In the rectifier section 35 in FIG. 6(c), the bias voltage v3 is applied to the output terminal of the rectifier circuit 14b via a discharge resistor 16. The v3 is supplied from the power supply section 6. By setting the v3 higher than the vss, the power required for charging the voltage at the output terminal of the rectifier circuit 14b to a threshold voltage of a voltage detector 32 can be reduced.

Hereinabove, application of the configuration of the power supply startup system according to the present embodiment makes it possible to obtain larger power from the wireless startup signal s0 and makes it possible to shorten the wireless startup signal s0. Accordingly, the startup at higher speed by the wireless signal can be performed.

Further, the power supply section 6 consumes only the power for generating the bias voltages v1, v2 in the standby state, and a standby current can be reduced.

Further, application of the bias voltages v1, v2 makes it possible to startup even by weaker wireless startup signal s0.

Further, though the power can be taken out from the weaker wireless signal, a possibility of erroneously detecting a signal of another system, noise, or the like can be prevented by providing the discharge resistor at the output of the rectifier section, and erroneous detection can be reduced by providing the appropriate discharge resistor.

In the present embodiment, a battery cell monitoring section 8 monitors the battery cell group 9. However, the battery cell monitoring section 8 is not necessarily provided. The device may include a temperature sensor, a humidity sensor, an acceleration sensor, or the like for sensing an external environment.

Further, in the present embodiment, each power supply startup device 1 has a configuration in which terminals at an uppermost level potential and a lowermost level potential of the battery cell group 9 are connected in series. However, these may not be connected with each other.

Further, the battery cells 9a, 9b, 9c connected in series are provided in the present embodiment. However, battery cells connected in parallel may be provided, or one battery cell may be provided.

Embodiment 3

In the present embodiment as well, a power supply startup system having a device provided with a battery cell is described with reference to the drawings.

Figure 7:
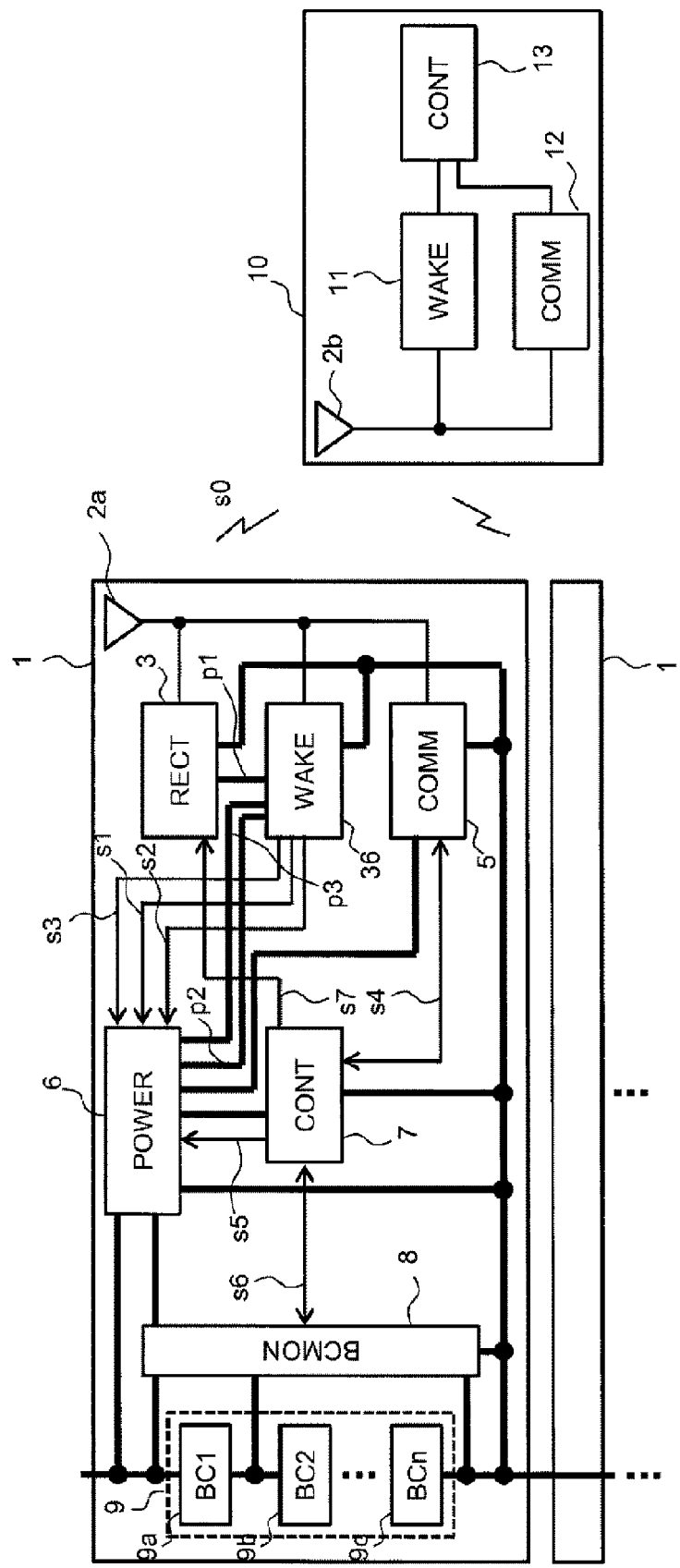
FIG. 7 is a block diagram illustrating a configuration example of a power supply startup system according to Embodiment 3.

FIG. 7 is a block diagram illustrating a configuration example of the power supply startup system. A startup preparation signal s3 is output from a startup reception section 36 to a power supply section 6, and a power p3 is output from the power supply section 6 to the startup reception section 36. Accordingly, startup by a weaker wireless startup signal s0 becomes possible, or startup by a shorter wireless startup signal s0 becomes possible.

Figure 8:
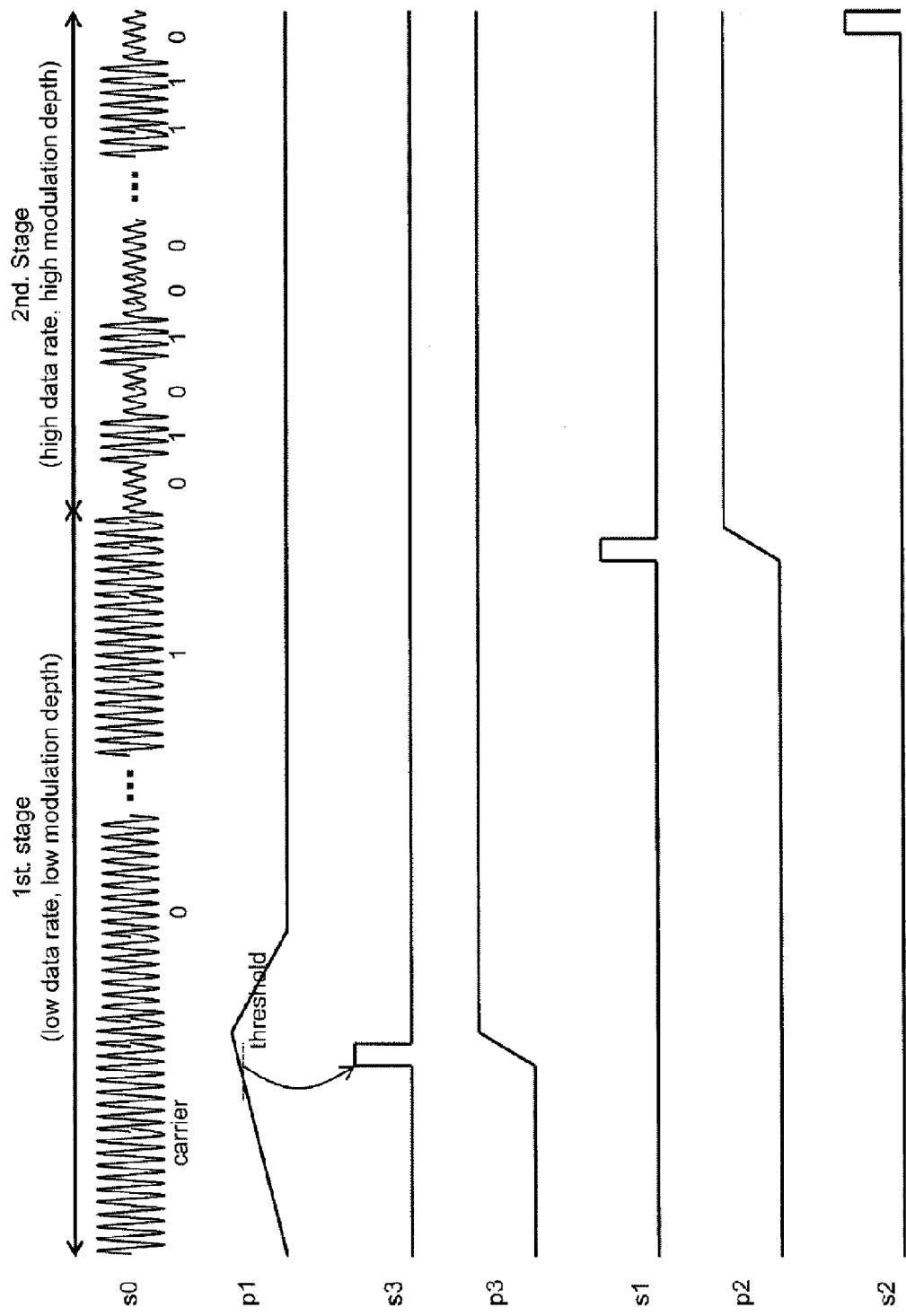
FIG. 8 is a signal waveform chart for describing a power supply startup method in the power supply startup system.

FIG. 8 is a signal salute for describing a relationship between the powers p1, p2, p3 supplied to the startup reception section 36 and the wireless startup signal s0, respective output signals s1, s2, s3 supplied from the startup reception section 36 to the power supply section 6. A difference between Embodiments 1 and 3 is that, when a voltage of the power p1 exceeds a predetermined threshold value, the startup reception section 36 outputs the startup preparation signal s3 to the power supply section 6, and the power supply section 6 supplies the power p3 to the startup reception section 36 after receiving this signal. A power for receiving a data pattern at a first stage of the wireless startup signal s0 by the startup reception section 36 is provided by the power p1 supplied from a rectifier section 3 and the power p3 supplied from the power supply section 6. Accordingly, a power obtained from the wireless startup signal s0 by the rectifier section 3 is reduced. With this configuration, the first stage of the wireless startup signal s0 can be shortened. The power for receiving the data pattern at the first stage of the wireless startup signal s0 by the startup reception section 36 may be provided only by the power p3 supplied from the power supply section 6. When only the power p3 is provided, the power obtained from the wireless startup signal s0 can be further reduced, thereby further shortening the wireless startup signal s0.

The startup preparation signal s3 may be a pulse signal or may be a signal which transits between low and high, such as a step response.

Upon completing reception of the first stage of the wireless startup signal s0, the startup reception section 36 compares the received data pattern and a predetermined data pattern. As a result of comparison, when the received data pattern matches the predetermined data pattern, the startup reception section 36 outputs the first startup signal s1. When the data patterns do not match, the first startup signal s1 is not output and returns to a standby state. Means of returning to the standby state is realized when the power supply section 6 stops supply of the power p3 after a predetermined time has elapsed. Alternatively, the startup reception section 36 may output a standby signal to the power supply section 6 and stop the supply of the power p3. The same applies to a second stage of the wireless startup signal s0. In this way, only when all the data patterns of the wireless startup signal s0 match the predetermined data pattern, the power supply startup device 1 activates. Accordingly, erroneous startup by erroneous detection of noise or the like can be suppressed. The startup preparation signal s3, the first startup signal s1, or the second startup signal s2 may be a pulse signal, or may be a signal which transits between low and high, such as a step response.

Further, in an environment where noise is small, it is possible that all the data patterns of the wireless startup signal s0 for determining the startup are provided at the second stage and that a signal power of the wireless startup signal s0 is detected at the first stage. In this case, the power p2 is supplied to the startup reception section 4 by the startup preparation signal s3, and the power p3 and the first startup signal s1 are omitted. In this way, the wireless startup signal s0 can be further shortened by providing all the data patterns for determining the startup at the second stage.

Further, the wireless startup signal s0 may have two stages or more and may have three stages. By increasing the number of stages and reducing the power consumption, when it is determined that the wireless startup signal s0 is not directed to the own power supply startup device 1, a power amount supplied from the power supply section 6 can be reduced.

Figure 10:
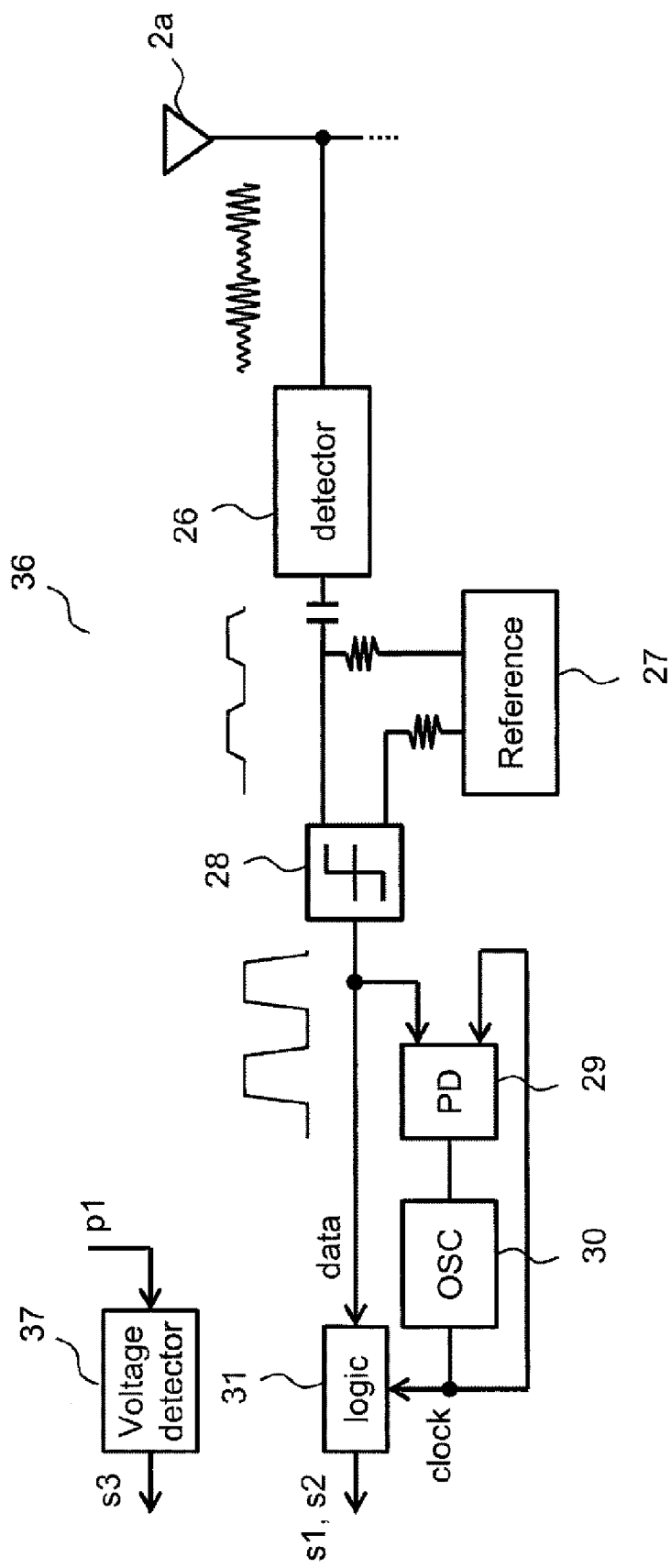
FIG. 10 is a circuit diagram illustrating a circuit configuration example of a startup reception section in a power supply startup device.

FIG. 10 is a configuration example of the startup reception section 36. When the power P1 is input to a voltage detector 37 and the voltage of the power p1 exceeds a threshold voltage of the voltage detector 37, the voltage detector 37 outputs the startup preparation signal s3. The voltage detector 37 operates by using the power p1.

Instead of the voltage detector 37, the preparation signal s3 may be output by using a voltage detector 32 in the rectifier section 3. Since the two detectors 32, 37 detect the voltage of the power p1, they can be shared.

Hereinabove, application of the configuration of the power supply startup system according to the present embodiment makes it possible to reduce the power obtained from the wireless startup signal s0. Accordingly, the startup can be performed by the weaker wireless startup signal s0. Further, the wireless startup signal s0 can be shortened, and the startup at higher speed by the wireless signal can be performed.

Further, since the power supply section 6 interrupts the power supply in the standby state and the power is not consumed, a standby current can be significantly reduced.

In the present embodiment, a battery cell monitoring section 8 monitors a battery cell group 9. However, the battery cell monitoring section 8 is not necessarily provided. The device may include a temperature sensor, a humidity sensor, an acceleration sensor, or the like for sensing an external environment.

Further, in the present embodiment, each power supply startup device 1 has a configuration in which terminals at an uppermost level potential and a lowermost level potential of the battery cell group 9 are connected in series. However, these may not be connected with each other.

Further, battery cells 9a, 9b, 9c connected in series are provided in the present embodiment. However, battery cells connected in parallel may be provided, or one battery cell may be provided.

Further, implementation of Embodiment 3 combined with Embodiment 2 makes it possible to startup at higher speed.

Further, implementation of Embodiment 3 combined with Embodiment 2 makes it possible to startup even by the weaker wireless startup signal s0.

Embodiment 4

In the present embodiment as well, a power supply startup system having a device provided with a battery cell is described with reference to the drawings. In the present embodiment, a startup section is used as a reception section or a transmission section even during communication.

Figure 9:
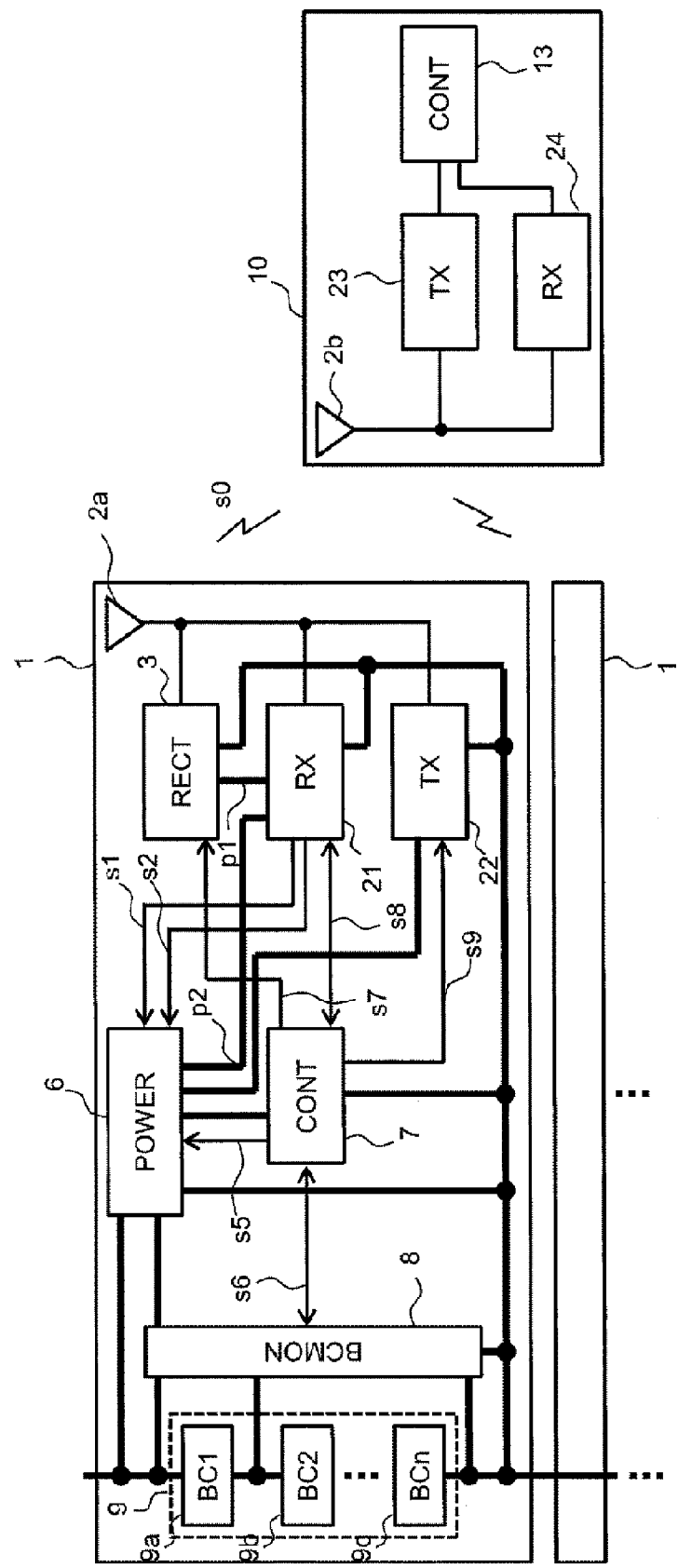
FIG. 9 is a block diagram illustrating a configuration example of a power supply startup system according to Embodiment 4.

FIG. 9 is a block diagram illustrating a configuration example of the power supply startup system. In contrast with Embodiment 1, the startup reception section 4 and the communication section 5 in the power supply startup device 1 are replaced with a reception section 21 and a transmission section 22. Further, the startup transmission section 11 and the communication section 12 in the master controller 10 are replaced with a transmission section 23 and a reception section 24.

The reception section 21 performs operation similar to that of the startup reception section 4 during startup. When communication is instructed from a control section 7, the reception section 21 receives a signal which is equal to or higher than a speed and a modulation depth of operation for receiving a second stage of a wireless startup signal s0 received by the startup reception section 4, and transmits a data pattern to the control section 7 (s8). With this configuration, the startup and the communication are realized in the same circuit. Further, since it is not necessary to have a reception function provided by the communication section 5, the communication section 5 is formed as the transmission section 22. Data to be transmitted to the master controller 10 is input to the transmission section 22 from the control section 7 (s9).

In the same way as the startup transmission section 11, the transmission section 23 transmits the wireless startup signal s0 during the startup and transmits the signal which is equal to or higher than the speed and the modulation depth of the second stage of the wireless startup signal s0 during the communication. With this configuration, the startup and the communication are realized in the same circuit. Further, since it is not necessary to have a transmission function provided by the communication section 12, the communication section 12 is formed as the reception section 24.

A power supply from a power supply section 6 may be increased during communication in such a manner that the reception section 21 receives a signal having a higher speed and a higher modulation depth compared to a case of receiving the second stage of the wireless startup signal s0. Further, a control section 13 may control the transmission section 23 during communication in such a manner that the transmission section 23 transmits the signal having the higher speed and the higher modulation depth compared to a signal at the second stage of the wireless startup signal s0. With this configuration, large communication data can be transmitted in a short time.

Hereinabove, application of the configuration of the power supply startup system according to the present embodiment makes it possible to realize the startup and the communication at high speed by using the same circuit.

In the present embodiment, a battery cell monitoring section 8 monitors a battery cell group 9. However, the battery cell monitoring section 8 is not necessarily provided. The device may include a temperature sensor, a humidity sensor, an acceleration sensor, or the like for sensing an external environment.

Further, in the present embodiment, each power supply startup device 1 has a configuration in which terminals at an uppermost level potential and a lowermost level potential of the battery cell group 9 are connected in series. However, these may not be connected with each other.

Further, battery cells 9a, 9b, 9c connected in series are provided in the present embodiment. However, battery cells connected in parallel may be provided, or one battery cell may be provided.

Further, implementation of Embodiment 4 combined with Embodiment 2 or Embodiment 3 makes it possible to startup at higher speed.

Further, implementation of Embodiment 4 combined with Embodiment 2 or Embodiment 3 makes it possible to startup even by the weaker wireless startup signal s0.

INDUSTRIAL APPLICABILITY

The present invention can be applied to a power supply startup system using a device provided with a battery or the like.

REFERENCE SIGNS LIST power supply startup device
2a, 2b antenna
3, 20, 34, 35 rectifier section
4, 36 startup reception section
5, 12 communication section
6 power supply section
7, 13 control section
8 battery cell monitoring section
9 battery cell group
9a, 9b, 9c battery cell
10 master controller
11 startup transmission section
14a, 14b rectifier circuit
15 storage element
16 discharge resistor
17, 18, 25, 33 switch
19 voltage limiter
21, 24 reception section
22, 23 transmission section
26 RF detector
27 reference voltage generation section
28 comparator
29 phase comparator
30 oscillator
31 logic circuit
32, 37 voltage detector
s0 wireless startup signal
s1 first startup signal
s2 second startup signal
s3 startup preparation signal
s4, s5, s6, s7, s8, s9 control signal
p1, p2, p3 power
v1, v2, v3 bias voltage

The invention claimed is:

1. A power supply startup system comprising:
a battery;
a device supplied with a power from the battery; and
a controller which performs a wireless communication with the device and is separately provided with the device,
wherein the device has a power supply section which serves as a power supply by using the power supplied from the battery, a startup section which receives a wireless startup signal transmitted by the controller and outputs a startup signal to the power supply section, a control section which controls the power supply section and the startup section, and a wireless communication section which performs wireless communication with the controller,
the wireless startup signal has two signal regions of a first stage and a second stage which is different from the first stage,
the startup section outputs a first startup signal to the power supply section when the startup section receives the wireless startup signal of the first stage,
the power supply section, to which the first startup signal has been input, starts supply of a first power to the startup section,
the startup section supplied with the first power outputs a second startup signal to the power supply section when said startup section receives the wireless startup signal of the second stage, and
the power supply section, to which the second startup signal has been input, starts supply of a second power different from the first power to the control section, and the control section starts power supply to the power supply section, the startup section, and the wireless communication section and starts control of operation of the power supply section, the startup section, and the wireless communication section.

2. The power supply startup system according to claim 1, wherein the startup section has a rectifier section which rectifies the input wireless startup signal and a reception section which receives the wireless startup signal, and
the startup section determines that the signal of the first stage has been received when an output voltage of the rectifier section which rectifies the wireless startup signal of the first stage exceeds a predetermined voltage, and the startup section determines that the signal of the second stage has been received when a data pattern of the wireless startup signal of the second stage substantially matches a predetermined data pattern.

3. The power supply startup system according to claim 2, wherein a storage element, a discharge resistor, or a voltage limiting element is connected to an output part of the rectifier section.

4. The power supply startup system according to claim 2, wherein a predetermined voltage is supplied from the power supply section to the rectifier section.

5. The power supply startup system according to claim 1, wherein the startup section determines that the first stage has been received when a data pattern at the first stage of the wireless startup signal matches a predetermined data pattern, and the startup section determines that the second stage has been received when a data pattern at the second stage of the wireless startup signal matches a predetermined data pattern.

6. The power supply startup system according to claim 5, wherein a data rate of the data pattern of the first stage is lower than a data rate of the data pattern of the second stage.

7. The power supply startup system according to claim 5, wherein the wireless startup signal is amplitude-modulated, and
a modulation depth of the data pattern of the first stage is lower than a modulation depth of the data pattern of the second stage.

8. The power supply startup system according to claim 5, wherein the startup section has a rectifier section which rectifies the input wireless startup signal and a reception section which receives the wireless startup signal,
the startup section outputs a third startup signal to the power supply section when an output voltage of the rectifier section which rectifies the wireless startup signal of the first stage exceeds a predetermined voltage, and the power supply section, to which the third startup signal has been input, supplies a third power to the startup section.

9. The power supply startup system according to claim 1, wherein the startup section has a rectifier section which rectifies the input wireless startup signal and a reception section which receives the wireless startup signal, and the reception section operates by using an output power of the rectifier section.

10. The power supply startup system according to claim 9, wherein a storage element, a discharge resistor, or a voltage limiting element is connected to an output part of the rectifier section.

11. The power supply startup system according to claim 9, wherein a predetermined voltage is supplied from the power supply section to the rectifier section.

12. The power supply startup system according to claim 1, wherein the startup section operates as a receiver of a wireless communication signal when the startup section performs wireless communication with the controller.

13. The power supply startup system according to claim 12, wherein a data rate of the data pattern of the second stage is equal to or lower than a data rate of the wireless communication signal.

14. The power supply startup system according to claim 12, wherein the wireless startup signal and the wireless communication signal are amplitude-modulated, and a modulation depth of the data pattern of the second stage is equal to or lower than a modulation depth of the wireless communication signal.

15. The power supply startup system according to claim 1, wherein the control section is in a stop state or a sleep state when the control section receives the wireless startup signal of the first stage.

16. A power supply startup system comprising:
a battery;
a device supplied with a power from the battery; and
a controller which performs wireless communication with the device and is separately provided with the device,
wherein the device has a power supply section which serves as a power supply by using the power supplied from the battery, a startup section which receives a wireless startup signal transmitted by the controller and outputs a startup signal to the power supply section, a control section which controls the power supply section and the startup section, and a wireless communication section which performs wireless communication with the controller,
the startup section has a rectifier section which rectifies the input wireless startup signal and a reception section which receives the wireless startup signal, and
the startup section receives supply of power from the rectifier section and the power supply section.

* * * * *